(No Model.) 2 Sheets—Sheet 2.

C. W. YOST.
BOLTING MACHINE.

No. 529,009. Patented Nov. 13, 1894.

Witnesses
John Smirie
W. E. Clendaniel

Inventor
Charles W. Yost
By T. J. W. Robertson
Attorney

UNITED STATES PATENT OFFICE.

CHARLES W. YOST, OF STEELTON, PENNSYLVANIA.

BOLTING-MACHINE.

SPECIFICATION forming part of Letters Patent No. 529,009, dated November 13, 1894.

Application filed January 13, 1894. Serial No. 496,795. (No model.)

*To all whom it may concern:*

Be it known that I, CHARLES W. YOST, a citizen of the United States, residing at Steelton, in the county of Dauphin and State of Pennsylvania, have invented certain new and useful Improvements in Bolting-Machines, of which the following is a specification, reference being had therein to the accompanying drawings.

This invention relates to that class of bolts having a gyrating motion, and it consists in the peculiar construction, arrangement and combinations of parts hereinafter more particularly described and then definitely claimed.

Figure 1:
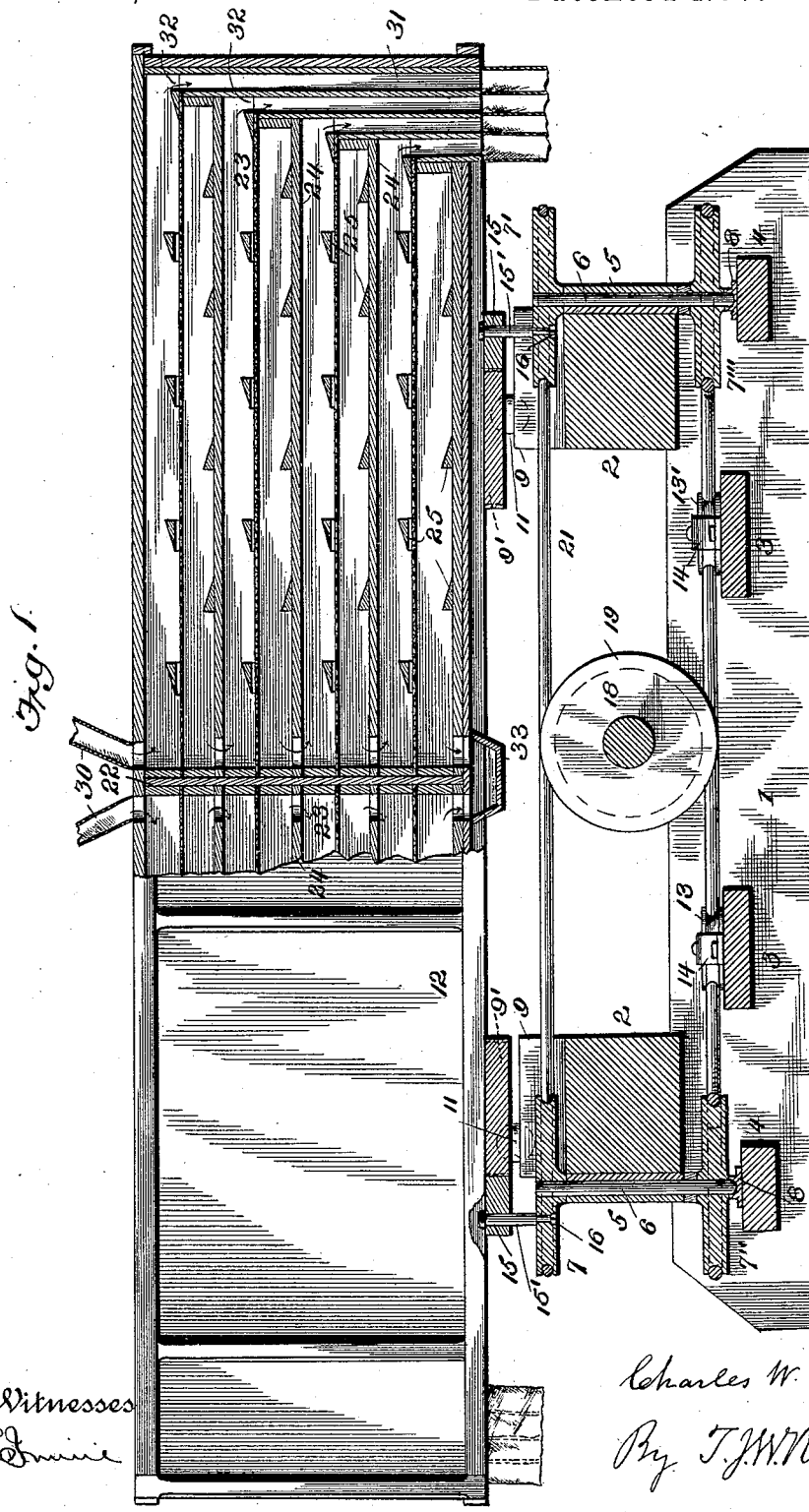
Figure 2:
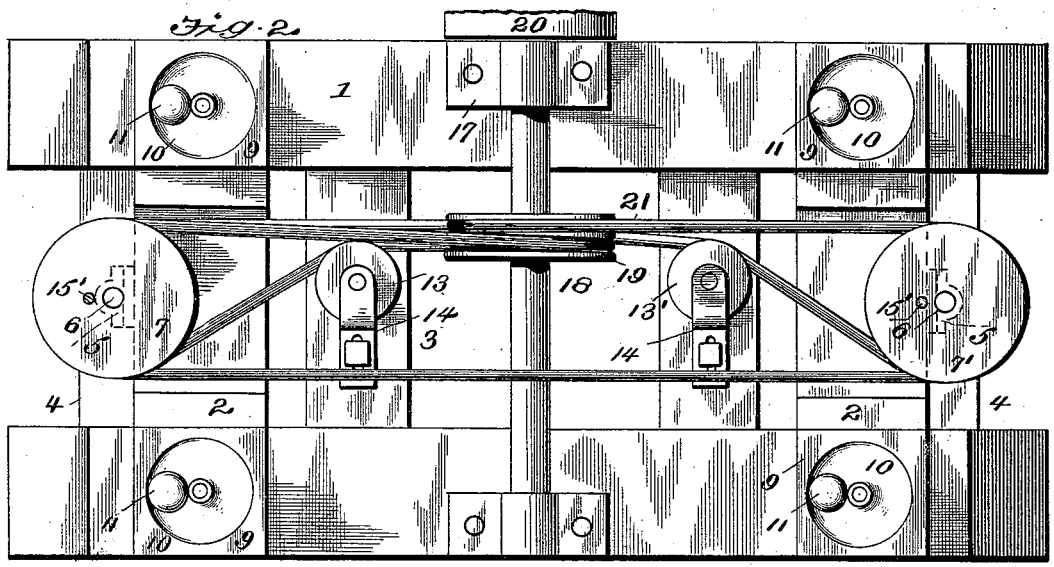
Figure 3:
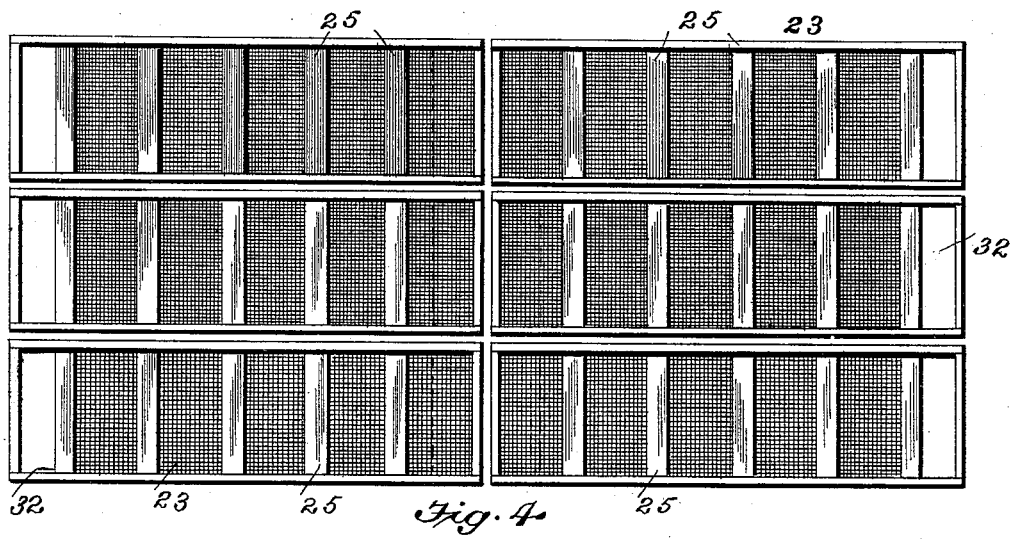
Figure 4:
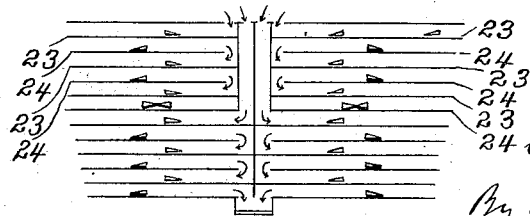

In the accompanying drawings—Figure 1 is a vertical central longitudinal section of a bolt constructed according to my improvement with the sieve box partly in elevation. Fig. 2 is a plan with the sieve box removed. Fig. 3 is a plan of the sieve box with the top removed. Fig. 4 is a diagrammatic view of part of a sieve box of double the capacity of that shown in Fig. 1.

Referring now to the details of the drawings by figures—1 represents the base or frame, having cross pieces 2, 3 and 4. Attached to the cross pieces 2 are boxes 5, in which run shafts 6, having on their opposite ends belt pulleys 7, 7', 7'', and 7''', and their lower ends running in steps 8 attached to or set in the cross-bar 4. At each corner of the base are set castings 9 of any suitable metal, each having an annular groove 10 in which runs a ball 11. On the under side of the sieve box 12, at each corner thereof, are castings 9' corresponding to the castings 9 and having a groove exactly like them. These plates rest on the balls 10, and by this means the sieve box is evenly and strongly supported, and yet a gyrating motion may be imparted to the same with the least possible expenditure of power. On the cross bars 3 are set adjustable idler or guide pulleys 13, 13', which may be adjusted by means of the slotted supports 14.

At 15 are shown bearings secured to the under side of the sieve box 12, in which are set bolts 15', secured in the pulleys 7, 7', by nuts 16.

Running in suitable boxes 17 mounted on the frame or base is a horizontal shaft 18, having a double grooved pulley 19 and a belt pulley 20, by which latter the shaft and the entire machine is driven, said shaft and pulley 19 giving motion to the rope belt 21, which runs from the near groove of said pulley 19 to the farther side of pulley 7, around that to and around pulleys 7', from thence to the farther groove in pulley 19, around that to the idler or guide pulley 13', from that to the near side of the pulley 7''', and around that to the farther side of pulley 7'', and from that to the guide pulley 13 and the near groove of pulley 19, and from that to the farther side of pulley 7 as before. This arrangement of the belts and pulley will be found to be very advantageous, as the pressure of the belt is equal on both ends of the vertical shafts, inasmuch as there is a pulley on each end of said vertical shafts around which the belt passes; whereas when the pulley is on one end of a shaft there is a tendency of the belt to pull the shaft over to one side. Besides this equality of pressure, there being two pulleys on each vertical shaft, there is double the amount of surface for the belt to act on, and thus the belt may become looser without slipping than where there is but a single pulley on the shaft.

The sieve box as shown in Fig. 3 contains six sets of sieves, so that six lots of material may be acted on at once, from as many different sets of rolls or stones. These sieves are arranged in sets of three on each side of the central partition 22, as shown, and 23 indicates the sieves. These sieves may be made each one separate from the others, or they may be all joined or made in one, divided by bars running lengthwise, so as to be in effect three sieves. These sieves are set in layers as shown in Fig. 1 with a conveyer 24 under each sieve, and both sieves and conveyers have stops 25 set over them crosswise. The stops on the conveyers are set close down upon the boards forming their bottoms, but the stops on the sieves are set in the present instance slightly above the cloth forming the bottom of the sieve, say from one-sixteenth to one-eighth of an inch from it, but I do not limit myself to this, as in some cases I may set the stops close to the cloth.

The operation is as follows: Motion being given to the shaft 18 and pulley 19, the rope belt 21, which in turn operates the pulleys 7 and 7', and these give motion to the bolts 15', which as they revolve give the seed box a gyrating motion. The stock to be operated on is fed in through the flexible tubes 30 and drops on the top sieve where the gyratory motion whirls it over the sieve, the coarser particles rising to the top and passing over the inclined sides of the stops, while the finer particles pass under them and are held from returning by the coarser materials, which latter are prevented from returning by the vertical sides of the stops. Every motion of the box carries the stock farther along, the finer passing through the cloth forming the bottom of the sieve, while the coarser passes over the end and down the passage 31. Owing to the stops on the conveyers 24 having their inclined sides set in the opposite direction, the finer material that drops through the sieve onto said conveyer is carried in the opposite direction until it drops over the end, as shown by the arrow, and falls upon the second sieve, where the material pursues a similar course, the coarser passing down the passage 32 and the finer dropping through the cloth upon the the second conveyer, where it is carried back to fall again and on to the third sieve, and so on until six different grades have been made, and the finest product of all drops upon a transverse conveyer 33 and so out of the machine.

The diagrammatic view, Fig. 4, shows an arrangement of sieves which may be double the capacity of the plan shown in Fig. 1, the meal entering and passing onto the different sieves, as shown by the arrows.

I am aware that it has been proposed to provide a purifier and dust collector with sieves having inclined slats arranged transversely a short distance above the sieve cloth, but with such slats (as their under sides are inclined) the coarser particles become wedged into the wedge-like space beneath the slats. When the slats are triangular or with one vertical side, there is no danger of the coarser material becoming wedged under the slats, because they cannot get under, and therefore will not be wedged there.

I do not limit myself to the arrangement shown in Fig. 3, as any desired number of sieves or sets of sieves may be set side by side, so that instead of there being six sets of sieves there may be eight, ten, or more. Nor do I limit myself to the particular arrangement of belting and pulleys shown, nor to driving the sieve box at both ends, as I may sometimes use a central driving device or I may drive it at one end only, but at present I prefer the method of driving shown.

In some cases I may cause the meal to enter at the opposite ends and the flour to pass out at the ends also, but I consider the arrangement shown the best.

What I claim as new is—

1. In a bolting machine, a sieve having a series of triangular transverse stops set a short distance above the surface of the cloth, and having one side inclined to allow the coarse material to pass easily over, and one side substantially vertical to prevent the backward movement of the same under said stops, substantially as described.

2. The combination in a bolting or sifting machine, of a frame 1, having a series of grooved plates 9, a ball 11 in each of said plates, a sieve box having corresponding plates 9' resting on the balls, two vertical shafts 6, pulleys 7, 7', 7" and 7''' mounted on said shafts, the rotary shaft 18, the belt pulley 20 and double grooved pulley 19 mounted on said shaft 18, the idler pulleys 13, 13', a round belt 21 running on the grooved and idler pulleys, and a driving connection between the pulleys 7, 7' and the sieve box, all substantially as described and shown.

3. The combination in a bolting or sifting machine and with the sieve box thereof, of the vertical shaft 6, grooved pulleys 7, 7', 7" and 7''' mounted on said shafts, the rotary shaft 18, the belt pulley 20 and double grooved pulley 19 mounted on said shaft 18, the idler pulleys 13, 13', a round belt 21, running over the grooved and idler pulleys mentioned, and a driving connection between the pulleys 7, 7' and the sieve box, substantially as described and shown.

In testimony whereof I affix my signature, in presence of two witnesses, this 11th day of January, 1894.

C. W. YOST.

Witnesses:
DAVID E. MOORE,
T. J. W. ROBERTSON.